United States Patent [19]

Yamamoto

[11] Patent Number: 4,619,396
[45] Date of Patent: Oct. 28, 1986

[54] COLD PRESSURE-WELDING APPARATUS

[75] Inventor: Toshio Yamamoto, Yokosuka, Japan

[73] Assignee: Kabushiki Kaisha Toshiba, Kawasaki, Japan

[21] Appl. No.: 650,996

[22] Filed: Sep. 17, 1984

Related U.S. Application Data

[63] Continuation-in-part of Ser. No. 361,374, Mar. 24, 1982, abandoned.

[30] Foreign Application Priority Data

Apr. 3, 1981 [JP] Japan .................................. 56-49390

[51] Int. Cl.$^4$ ............................................. B23K 20/00
[52] U.S. Cl. ..................................... 228/102; 228/115; 228/3.1; 228/9; 173/11
[58] Field of Search ..................... 173/11, 12; 228/102, 228/115, 3.1, 8, 9

[56] References Cited

U.S. PATENT DOCUMENTS

| | | | |
|---|---|---|---|
| 3,219,748 | 11/1965 | Miller | 228/115 |
| 3,242,555 | 3/1966 | Weber | 228/115 |
| 3,727,822 | 4/1973 | Umbaugh | 228/1 |
| 3,988,825 | 11/1976 | Fuchs | 228/3.1 |
| 4,027,530 | 6/1977 | Tambini | 173/12 |
| 4,074,772 | 2/1978 | Jonsson | 173/12 |
| 4,104,778 | 8/1978 | Vliet | 173/12 |
| 4,163,310 | 8/1979 | Sigmund | 173/12 |
| 4,163,311 | 8/1979 | Sigmund | 173/12 |
| 4,179,786 | 12/1979 | Eshghy | 173/12 |
| 4,235,006 | 11/1980 | Eshghy | 173/12 |

FOREIGN PATENT DOCUMENTS

| | | |
|---|---|---|
| 1526947 | 10/1978 | United Kingdom. |
| 1526946 | 10/1978 | United Kingdom. |
| 1594478 | 7/1981 | United Kingdom. |
| 610642 | 5/1978 | U.S.S.R. ............................ 228/3.1 |

OTHER PUBLICATIONS

J. Ruge, "Handbuch der Schweisstechnik" (1974), pp. 322 to 326.

Primary Examiner—Nicholas P. Godici
Assistant Examiner—Christopher L. McKee
Attorney, Agent, or Firm—Oblon, Fisher, Spivak, McClelland & Maier

[57] ABSTRACT

A cold pressure-welding apparatus has a pressure-welding load detector and a displacement detector for detecting the displacement of pressure-welding parts which are mounted on a cold pressure-welding apparatus main body; and an arithmetic operation control circuit which receives output signals from the detectors to detect yield points on a load-displacement curve, calculates an optimum load for optimally performing cold pressure-welding on the basis of a yield load at a second yield point, and outputs to the cold pressure-welding apparatus main body a signal for stopping cold pressure-welding when an actual pressure-welding load reaches the optimum load.

2 Claims, 10 Drawing Figures

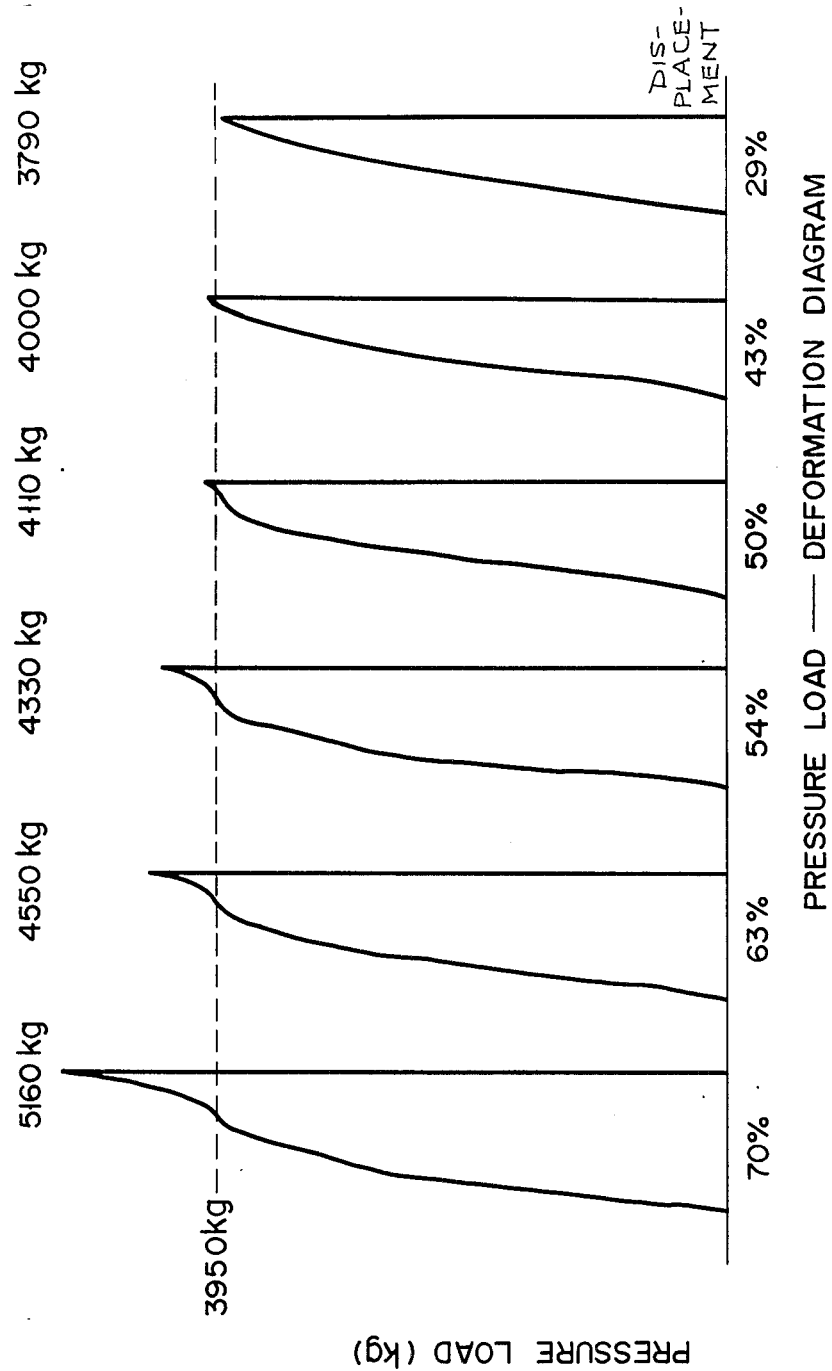

Welding Deformation 69 (%)

Welding Deformation 63 (%)

Welding Deformation 54 (%)

Cross section of weld in copper (×100) with nickel plating

Welding Deformation 50 (%)

Welding Deformation 43 (%)

Welding Deformation 24 (%)

Cross section of weld in copper ( x 100 ) with nickel plating

COLD PRESSURE-WELDING APPARATUS

This application is a continuation-in-part of application Ser. No. 361,374, filed Mar. 24, 1982 now abandoned.

BACKGROUND OF THE INVENTION

The present invention relates to a cold pressure-welding apparatus.

Conditions of cold pressure-welding are controlled according to the pressure-welding load exerted on the pressure-welding part of an object, i.e. the amount of deformation of said part.

FIG. 1 shows a load-displacement curve which represents the relationship between a pressure-welding load L(X) exerted on an object to be pressure-welded and a displacement X of the pressure-welding part of the object. In the conventional method, a yield load LO at a yield point 4 of the material of each object having a specific size is calculated. Here, the term "yield point" is used in the sense of strength of materials and is located at the boundary between an initial linear elastic deformation part 2 and a non linear plastic deformation part 3 of the load-displacement curve. An optimum load LA which holds a predetermined relationship with the yield load LO is then determined. Thus, cold pressure welding is performed utilizing this optimum load LA as the pressure welding stop condition if conditions remain the same. However, in practice, the load-displacement curve changes from one pressure-welding object to another due to the fluctuations in the thickness of the pressure-welding object or nonuniform heat-treatment. For this reason, the initially set optimum load LA frequently becomes unsuitable. In some cases, the working rate becomes too high thus degrading the strength of the overall pressure-welding objects, or the working rate becomes too low thus decreasing the pressure-welding strength.

SUMMARY OF THE INVENTION

It is an object of the present invention to provide a cold pressure-welding apparatus which calculates an optimum load for each pressure-welding object so as to perform proper pressure-welding.

In order to achieve the above and other ends, there is provided according to the present invention a cold pressure-welding apparatus comprising: a cold pressure-welding apparatus main body having a pair of dies for clamping pressure-welding objects therebetween and a drive mechanism for driving said dies; a pressure-welding load detector which is mounted on said pressure-welding apparatus main body; a displacement detector which is mounted on said cold pressure-welding main body and which detects an amount of displacement of the pressure-welding objects at pressure-welding parts thereof; and an arithmetic operation control circuit which is electrically connected to said cold pressure-welding main body which receives output signals from said load detector and said displacement detector for each pressure-welding object to detect a second inflection point of change on a load-displacement curve, which calculates an optimum load for suitably performing cold pressure-welding on the basis of a pressure-welding load at the second inflection point of change, and which outputs to said cold pressure-welding apparatus main body an electric signal to stop cold pressure-welding when an actual pressure-welding load reaches the optimum load.

BRIEF DESCRIPTION OF THE DRAWINGS

FIG. 7 is a pressure load-deformation diagram illustrating the effect of pressure load on deformation (the scale being such that a first yield point is not evident)

DETAILED DESCRIPTION OF THE PREFERRED EMBODIMENT

Figure 2A:
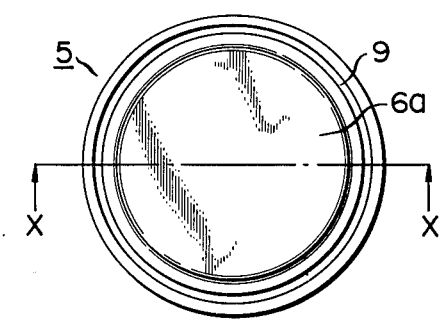
FIGS. 2A and 2B are respectively a plan view of an object to be pressure-welded and a sectional view along the line X—X thereof according to an embodiment of the present invention.
Figure 3:
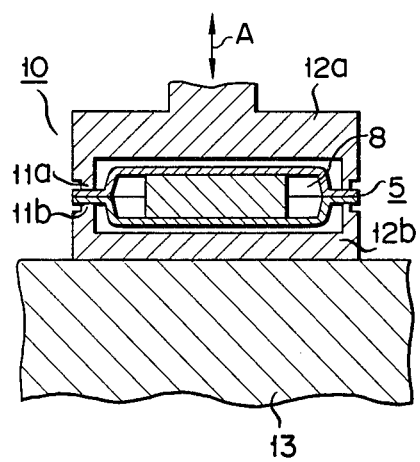
FIG. 3 is a schematic longitudinal sectional view of a cold pressure-welding apparatus according to the present invention.
Figure 2B:
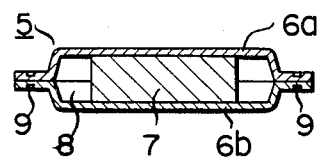
Figure 4:
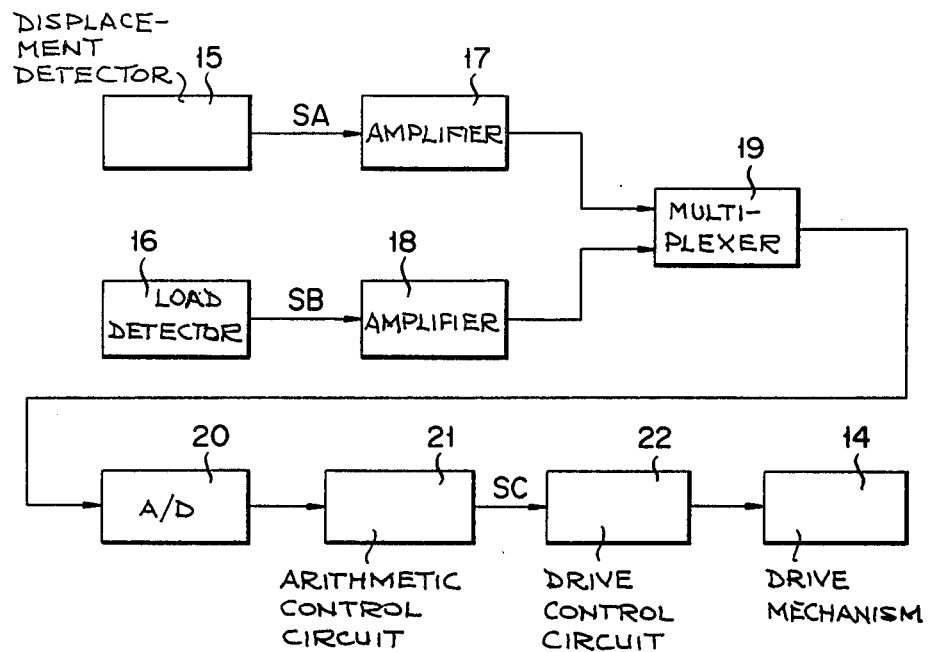
FIG. 4 is a block diagram of the cold pressure-welding apparatus according to the present invention.

The preferred embodiment of the present invention will now be described with reference to the accompanying drawings. FIG. 2 shows pressure-welding objects 6a and 6b according to this embodiment. Circular recesses are formed at the centers of the respective pressure-welding objects 6a and 6b. When the pressure-welding objects 6a and 6b are superposed with their recesses facing each other, a housing space 8 for housing a semiconductor element 7 or the like is formed therebetween. When annular pressure-welding parts 9 are subjected to cold pressure-welding, the semiconductor element 7 can be sealed within a vessel 5 without exerting thermal stress on the semiconductor element 7. A cold pressure-welding apparatus main body 10 for performing such pressure-welding has, as shown in FIG. 3, a pair of dies 12a and 12b which, in turn, have rings 11a and 11b so located to face the annular pressure-welding parts 9. The die 12b is fixed to a base 13 of the cold pressure-welding apparatus main body 10. The die 12a is held vertically movable along the direction indicated by arrow A by a drive mechanism 14 (a hydraulic circuit, not shown) of the cold pressure-welding apparatus main body 10. As shown in FIG. 4, to this drive mechanism 14 is mounted a displacement detector 15 such as a differential transformer which detects the amount of displacement of the die 12a during cold pressure-welding, that is, the amount of displacement of the pressure-welding parts 6a and 6b at the pressure-welding parts 9. A load detector 16 such as a load cell for detecting a pressure-welding load is mounted to the drive mechanism 14 or to the base 13. The displacement detector 15 and the load detector 16 are electrically connected to a multiplexer 19 through amplifiers 17 and 18, respectively. This multiplexer 19 alternately switches connections to the amplifiers 17 and 18 at short intervals. The multiplexer 19 is connected to an analog-to-digital converter 20 (to be referred to as the AD converter 20 hereinafter). The AD converter 20 is connected to an arithmetic operation control circuit 21 which may comprise a microcomputer and which has functions of storing data, controlling other parts, and arithmetic operations. The arithmetic operation control circuit 21 is connected to a drive control circuit 22 which controls the drive mechanism 14.

Figure 1:
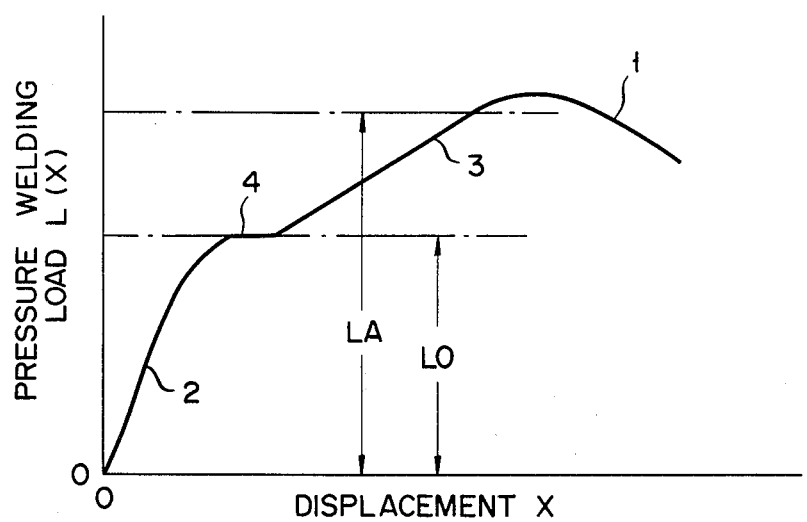
FIG. 1 is a graph showing a load vs. displacement curve in cold pressure-welding.
Figure 5:
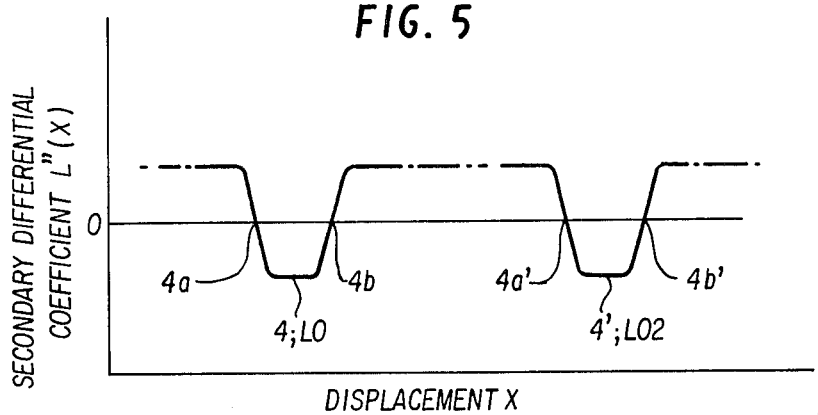
FIG. 5 is a graph showing the secondary differentiation curve of the load vs. displacement curve shown in FIG. 1.
Figure 6:
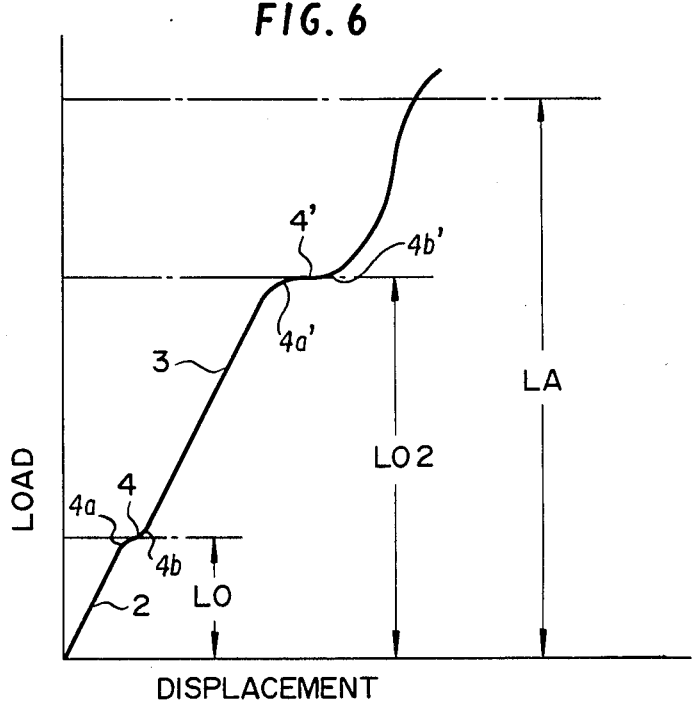
FIG. 6 exaggerates the load vs. displacement curve of FIG. 1 at the first and second inflection points.

The mode of operation of the cold pressure-welding apparatus as described above will now be described. When the drive mechanism 14 is operated to start cold pressure-welding of the pressure-welding objects 6a and 6b, the rings 11a and 11b of the dies 12a and 12b urge against the pressure-welding parts 9 of the pressure-welding objects 6a and 6b. Then, signals SA and SB are respectively output by the displacement detector 15 and the load detector 16. These signals SA and SB are alternately supplied to the AD converter 20 at extremely short intervals by the multiplexer 19. Digital signals SA and SB output from the AD converter 20 are supplied to and sequentially stored in the arithmetic operation control circuit 21. As the cold pressure-welding progresses, the pressure welding load L(x) and the pressure-welding part displacement x change according to a load-displacement curve 1 shown in FIG. 1. On the basis of the digital signals SA and SB stored in the arithmetic operation control circuit 21, the arithmetic operation control circuit 21 performs the differentiation twice to provide a secondary differentiation curve L"(x) as shown in FIG. 5. The load vs. displacement curve shown in FIG. 6 illustrates that first and second deformations, i.e., yield points, 4 and 4' respectively occur at loads LO and LO2. The existance of yield points 4 and 4' is also evident from the secondary differentiation curve L"(x) shown in FIG. 5.

As evident from FIG. 5, the first yield point 4 occurring at load LO is characterized by zero-crossings 4a and 4b which correspond to inflection points 4a and 4b shown in the graph of FIG. 6. Similarly, the second yield point 4' occurring at load LO2 is characterized by zero-crossings 4a' and 4b', also corresponding to inflection points 4a' and 4b' shown in the graph of FIG. 6.

According to the invention, it has been experimentally determined, as described hereinafter, that the second yield point corresponding to load LO2 holds a predetermined ratio to an optimum load, LA, for suitably pressure-welding the pressure-welding objects 6a and 6b. According to the invention, the second yield point 4' is detected by detecting a selected of either of the inflection points 4a' or 4b' associated therewith, it being recalled that inflection points 4a' and 4b' are detected as being zero-crossings of the curve L"(x) at the second yield point. The load LO2 existing upon detecting the second yield point 4' is then detected. Utilizing this, the yield load LO2 is multiplied by a coefficient $\alpha$ which is preset according to the material properties of the pressure-welding objects 6a and 6b. The optimum load LA is thus calculated. Thereafter, the arithmetic operation control circuit 21 compares the actual pressure-welding load L(x) corresponding to the signal SB with the optimum load LA. When the pressure-welding load L(X) reaches the optimum load LA, the arithmetic operation control circuit 21 outputs a drive stop signal SC to the drive control circuit 22 to stop the operation of the drive mechanism 14, thus completing the cold pressure-welding. The cold pressure-welding is performed in the same manner for individual pairs of pressure-welding objects 6a and 6b. In this case, since the inflection points 4a' and 4b' are inherent in the material of the pressure-welding objects 6a and 6b, a selected of the points 4a' and 4b' is utilized as the point of change on the load-displacement curve for the purpose of calculating the optimum load LA, the correct optimum load LA may be obtained. Furthermore, since the optimum load LA is obtained by multiplying the yield load LO2 by a predetermined coefficient, the optimum load LA may be easily readjusted by changing the coefficient accordingly when the material of the pressure-welding objects 6a and 6b changes.

According to the cold pressure-welding apparatus of the present invention, the arithmetic operation control circuit receives signals output from the displacement detector and the load detector mounted to the cold pressure-welding apparatus main body and calculates a point of change on a load-displacement curve. On the basis of the pressure-welding load at the second inflection point the arithmetic operation control circuit calculates the optimum load suitable for the properties of the material of the pressure-welding objects. When the actual load reaches this optimum load, the arithmetic operation control circuit stops the cold pressure-welding. Accordingly, it is possible with the cold pressure-welding apparatus of the present invention to perform pressure-welding with an optimum load for an individual set of pressure-welding objects in accordance with the properties of the material of these objects. Even if the hardness or thickness of the pressure-welding objects changes, the working rate may not become too high thus degrading the strength of the overall objects nor become too low thus providing too small a pressure-welding strength. As a result, the product quality and the yield are improved. According to this invention, a second yield point, i.e., a second plastic deformation region, and a pressure-welding displacement-load diagram have a profound relation to the quality of pressure-welded articles. This has been determined by the following experiments:

PREPARATION OF SAMPLES AND MEASURING METHOD

Samples were obtained having a disk-like configuration with a thickness of 0.4 mm and an outer diameter of 50 mm. The samples had an annular projection of 38 mm in inner diameter, 42 mm in outer diameter and 1.5 mm in height, which projection absorbs an inward circumferential deformation. The composition used was oxygen free copper as shown in Table 1.

TABLE 1

| CHEMICAL COMPOSITION OF MATERIALS USED | | | | | | |
|---|---|---|---|---|---|---|
| Chemical Composition (%) | | | | | Mechanical Properties | |
| | | | | | T.S. | EI |
| Cu | S | Pb | P | O | kg/mm | (%) |
| 99.99 | 0.0018 | 0.001 | 0.0003 | 0.001 | 25 max | 40 min |

Welding pressure was applied to the material by a 200 tf compression tester and the relation of the pressure-welding deformation to the load was recorded. The pressure-welded articles were all obtained at a speed of 1.5 mm/min using a pair of upper and lower circular dies as a pressure-welding tool. A die having a trapezoidal cross-section, a top side width of 0.4 mm, angle of 45° and average diameter of 47.6 mm was used. For example, Ni, Cr, Ag and Sn platings were effected as a surface treating condition and then the respective pressure-weldability was examined over a deformation range of 24 to 70%. After being pressure-welded, the pressure-welded cross-section of the sample was microscopically examined, and the state of the Ni-plating layer at the pressure-welded boundary area was analyzed by an E.P.M.A. (Electron Probe Microanalyzer) for a face evaluation.

RESULTS AND EVALUATION

Figure 8A:
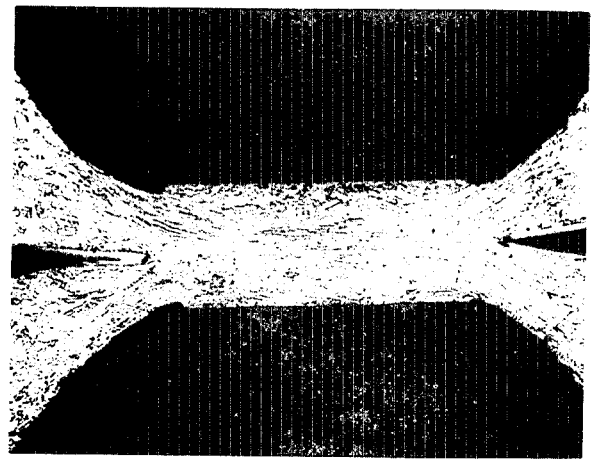
FIGS. 8 and 9 are micro-photographs of cross-sections of Ni-plated samples pressure welded in a deformation range of 24% to 69%.
Figure 8B:
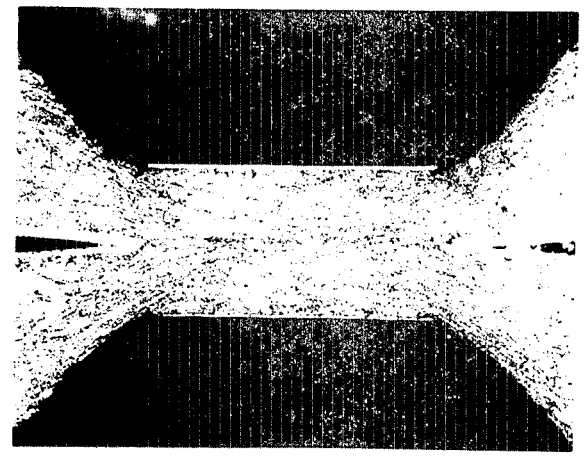
Figure 8C:
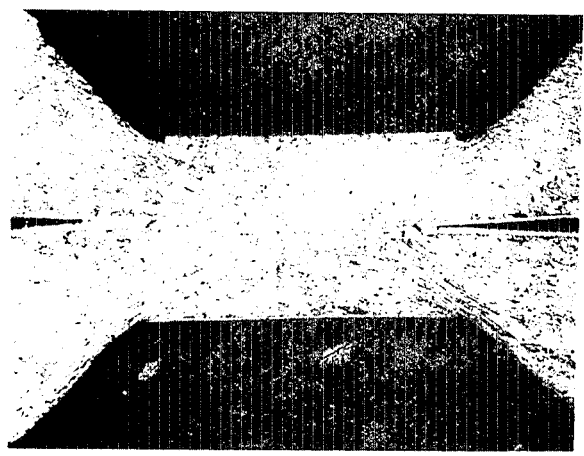
Figure 9A:
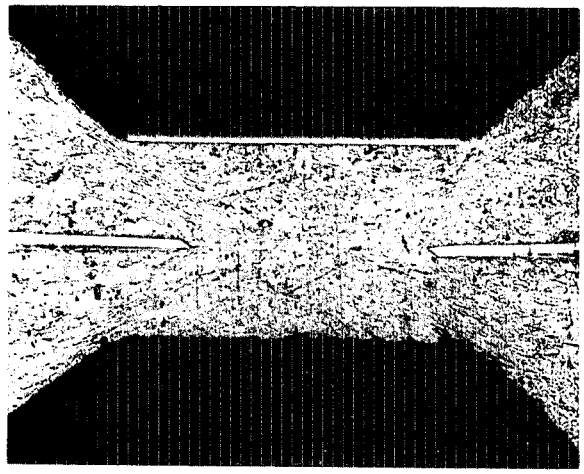
Figure 9B:
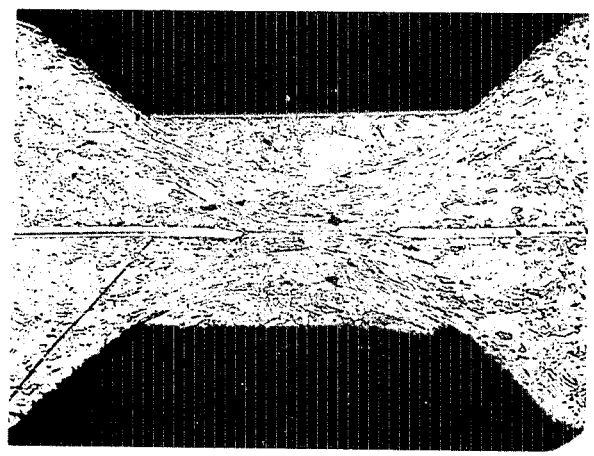
Figure 9C:
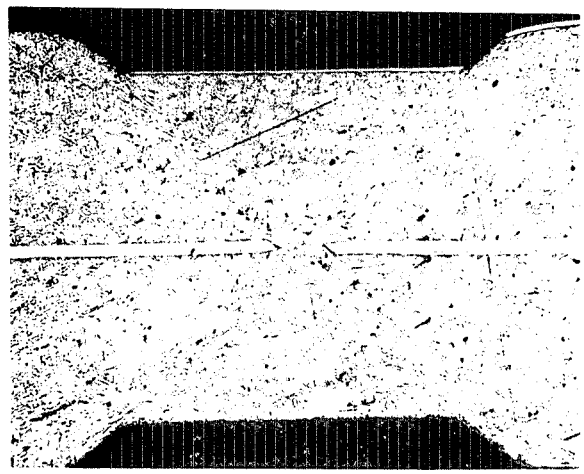

The micro-photographs shown in FIGS. 8 and 9 show the cross-sections of the Ni-plated samples when the deformation was in a range of 24 to 69%. For a deformation of 24%, the pressure-welded boundary area remains, but for a deformation of 43% the boundary area at the central portion of the pressure-welded sample begins to disappear. For a deformation of above 50%, the boundary area of the pressure-welded sample completely disappears. It has been found that no nickel-plating layer was present at the boundary area of the pressure-welded sample. From the above it is observed that the presence of the nickel-plating layer serves to effect a ready pressure-welding at the new surfaces of the copper as a base material and a consequent improvement in pressure-weldability. It has also been observed that a chromium plating has substantially the same advantage as that of the nickel plating. In a sample plated with Ag of a greater ductility, on the other hand, Ag remains as a thin layer at the pressure-welded boundary area after the material has been pressure-welded. This makes it difficult to pressure-weld the copper base material.

FIG. 7 shows displacement-load curves when the deformation is varied over a range from 29 to 70%. These curves correspond to the states shown in FIGS. 8 and 9 and show yield points in the neighborhood of 3950 kg where a marked deformation and plastic flow occur. That is, the pressure-welding occurs, starting from a deformation of 43% where the second yield point is reached. A substantially complete pressure-welding occurs at a deformation of about 50% where the second yield point is passed, noting that no pressure-welding takes place at a deformation of 29% where no yield point is reached. From this it will be appreciated tht the second yield point on the displacement-load curve has a relation to the quality of the pressure-welded article and is effective to the evaluation of the quality of the pressure-welded article.

In this connection it is to be noted that the second yield point 4', different from the first yielding point 4 shown in FIG. 6 of a transition from an ordinary elastic deformation region to a plastic deformation region, appears at a complete plastic deformation region (in the neighborhood of a deformation of 50%). This is a phenomenon occurring when pressure-welding is overlappingly effected at the circular area of the material and is due to a prominent plastic flow resulting from dislocation.

The apparatus of this invention detects the second yield point emerging at the above-mentioned plastic deformation region, and calculates, on the basis of a load at this time, an optimum pressure-welding load and stops the pressure-welding step when the optimum pressure-welding load is reached.

According to the embodiment described above, the optimum load is calculated by multiplication of the load at the second yield point by a predetermined coefficient. However, depending upon the properties of the material used for the pressure-welding objects, the optimum load may be calculated by addition of a predetermined load to the load at the second yield point inflection. In the embodiment described above, the arithmetic operation control circuit comprises a microcomputer. However, the present invention is not limited to this and the arithmetic operation control circuit may involve hardware. The principle of the present invention may be applied to cold pressure-welding of metals of different kinds. Furthermore, the present invention is not limited to cold pressure-welding at ambient temperature but may be extended to pressure-welding at temperatures below the recrystallization temperature of the raw metal material, for example, 400° C. or less.

What is claimed is:

1. A method of adaptively controlled cold pressure welding, wherein a set of parts is pressure-welded at overlapping circular areas, said method comprising the steps of: detecting a load-displacement curve during the pressure-welding of the set of parts to be pressure welded, finding a second yield point by detecting a second inflection point in the load-displacement curve detected for said set of parts, determining an optimum pressure-welding load for said set of parts based on the load at the second yield point, and removing the pressure-welding load on the set of parts when the load reaches the optimum pressure-welding load.

2. A method according to claim 1, wherein said determining step comprises:
multiplying the pressure-welding load at the second yield point on the load-displacement curve by a predetermined coefficient to determine said optimum pressure-welding load based on the product thereof.

* * * * *